C. L. BASTIAN.
DRUM VALVE.
APPLICATION FILED OCT. 30, 1919.
1,349,748.
Patented Aug. 17, 1920.
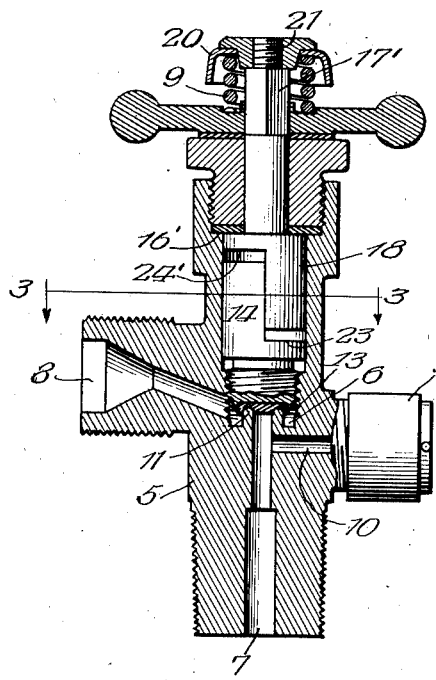
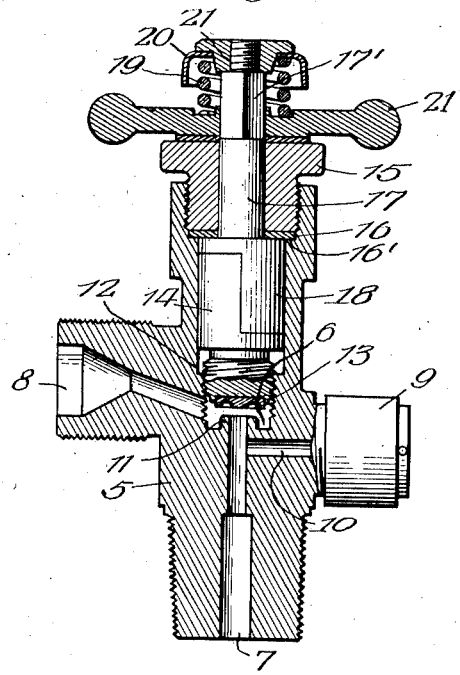
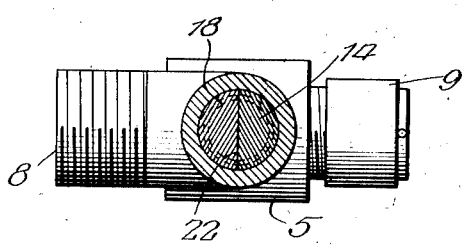
Inventor
Charles L. Bastian
By

UNITED STATES PATENT OFFICE.

CHARLES L. BASTIAN, OF CHICAGO, ILLINOIS.

DRUM-VALVE.

1,349,748.

Specification of Letters Patent.  Patented Aug. 17, 1920.

Application filed October 30, 1919.  Serial No. 334,442.

*To all whom it may concern:*

Be it known that I, CHARLES L. BASTIAN, a citizen of the United States, residing at Chicago, in the county of Cook and State of Illinois, have invented certain new and useful Improvements in Drum-Valves, of which the following is a specification.

This invention relates to novel improvements in valves for drums containing oxygen or hydrogen or other fluid under pressure, and its object is to provide a strong and substantial operative engagement between the rotatable stem and the seat nipple to withstand the strains to which they are often subjected in commercial use.

In the accompanying drawings I have illustrated a selected embodiment of the invention in a commercial form which I have found entirely satisfactory, and referring thereto—

Figure 1 is a sectional elevation showing the valve closed.

Fig. 2 is a similar view showing the valve open.

Fig. 3 is a horizontal sectional view on the line 3—3 of Fig. 1.

Fig. 4 is a detail enlarged view of the interengaging heads on the stem and seat nipple.

Referring to the drawings 5 indicates the valve casing having a valve chamber 6, and an inlet passage 7 and an outlet passage 8 connecting therewith. A safety device 9 is connected with the inlet passage by a passage 10. A valve seat 11 is located at the upper end of the inlet passage 7 in the valve chamber. A nipple 12 carrying a valve disk 13 at its lower end threadedly engages the wall of the valve chamber above the seat 11 and is provided with a head 14 at its upper end. A bushing 15 is screwed into the upper end of the casing against a washer 16, which is seated on the shoulder 16' within the casing and on the stem head 18. The valve stem 17 operates in this bushing and is provided with the head 18 complementary to the nipple head 14. A hand wheel 21 is rigidly engaged with the upper squared end 17' of the stem, and a spring 19 disposed between the hand wheel and a cap 20 held in place on the stem by nut 21 holds the stem head against washer 16 and the washer against the bushing 15.

The nipple must be rotated to give it longitudinal movement for unseating and seating the valve disk, and this rotary movement is produced by rotating the stem. Consequently there must be an engagement or connection between the stem and the nipple which will permit of the longitudinal movement of the nipple coincident with its rotary movement, while the stem has rotary movement only. Heretofore the stem and the nipple have been slotted at their adjacent ends and a steel connector plate has been engaged with both slots and fastened to the stem. The construction has been such that as the stem is rotated the nipple would rotate therewith and also move up and down on the connector plate. I have found, however, that in actual commercial use these valves are often subjected to very heavy strains and sometimes to very rough usage. The result is that the connection between the stem and the nipple is sprung, or otherwise badly injured or entirely broken so that the valve will not properly operate. Sometimes the connector plate is so badly bent and at other times the slotted ends of the stem and the nipple are so badly sprung and cracked or broken that the valve cannot be properly operated. It is the purpose of this invention, therefore, to provide a novel and very strong and substantial construction of parts where the stem and nipple are engaged to withstand the strains and rough usage to which these valves are subjected. Accordingly I provide heads 14 and 18 which are complementary to each other in every respect, and together form a complete cylinder, said heads comprising the cylindrical portions 14' 18' and the semicylindrical projections 14" 18". These projections have flat faces 22 which are substantial in length and the full width of the diameter of the cylinder formed by the two heads when interengaged, so that they form an engaging surface of extended area backed up by ample metal and strongly supported to constitute very strong and substantial engaging members which, it is believed, will withstand any strains and rough usage to which the valve may be subjected without entirely destroying the valve. In other words, it is my belief that this feature of the valve which has proved to be a point of weakness in the past is now in my improved valve one of the strongest points.

It will be readily understood that when the stem is rotated to unseat the valve (Fig. 1), the nipple will be rotated therewith and by reason of its threaded engagement with the casing the nipple will also travel away from the seat 11 until the shoulders 23 23' of the nipple head are firmly seated against the shoulders 24 24' of the stem head (Fig. 2).

The parts are so proportioned that to fully open or close the valve the hand wheel must be operated a certain number of turns. In closing the valve the nipple is screwed down until the disk is pressed tightly against the seat (Fig. 1). The shoulders 23, 23' move away from shoulders 24, 24' on the stem head, but the flat engaging faces 22 are of sufficient area and are so strongly supported by the metal behind them that they will withstand any further force applied on the handwheel. In opening the valve the nipple travels upward until shoulders 23, 23' engage shoulders 24, 24' (Fig. 2). Then nipple head 14 is firmly seated against stem head 18 and no amount of force applied to the handwheel will damage the heads.

I am aware that my invention may be embodied in other forms and in other valves and that changes in the proportion of parts and in the details of construction may be made without departing from the spirit or sacrificing the advantages of the invention and I reserve the right to make all such embodiments and changes as fairly fall within the scope of the following claims.

I claim:

1. A valve comprising a casing having a chamber and a passage leading thereto, a nipple rotatively and longitudinally movable in said chamber to close and open communication between said passage and the chamber, a rotatable stem mounted in the casing, and means for rotating the stem, said nipple and stem having overlapping and engaging semi-cylindrical heads to impart rotary movement from the stem to the nipple and permit the longitudinal movement of the nipple relative to the stem.

2. A valve comprising a casing having a chamber and a passage leading thereto, a nipple in said chamber threadedly engaging the wall thereof, a valve disk on said nipple to close said passage, a stem rotatively mounted in said casing, and means for rotating the stem, said nipple and stem having complementary semi-cylindrical overlapping heads with their flat faces in engagement.

3. A valve comprising a casing having a chamber and a passage leading thereto, a nipple relatively and longitudinally movable in said chamber to close and open communication between said passage and the chamber, a rotatable stem mounted in the casing against longitudinal movement, and means for rotating the stem, said nipple and stem having semi-cylindrical interengaging heads and said stem head having shoulders to be engaged by the nipple head in the opening longitudinal movement of the nipple to limit said longitudinal movement.

4. A valve comprising a casing having a chamber and a passage leading thereto, a nipple relatively and longitudinally movable in said chamber to close and open communication between said passage and the chamber, a rotatable stem mounted in the casing against longitudinal movement, and means for rotating the stem, said nipple and stem having heads located in said chamber and each comprising a cylindrical portion and a projecting semi-cylindrical portion, said semi-cylindrical portions being arranged with their flat faces in engagement.

5. A valve comprising a casing having a chamber and a passage leading thereto, a nipple relatively and longitudinally movable in said chamber to close and open communication between said passage and the chamber, a rotatable stem mounted in the casing against longitudinal movement, and means for rotating the stem, said nipple and stem having heads located in said chamber and each comprising a cylindrical portion and a semi-cylindrical portion, said semi-cylindrical portions being arranged with their flat faces in engagement, and each head having a semi-cylindrical shoulder on its cylindrical portion to be engaged by the end of the semi-cylindrical portion of the other head.

CHARLES L. BASTIAN.

Witnesses:
M. KENT DUNHAM,
E. N. KREIN.